Feb. 25, 1969  R. L. STEDFELD  3,429,594
QUICK DISCONNECT COUPLING
Filed June 22, 1967
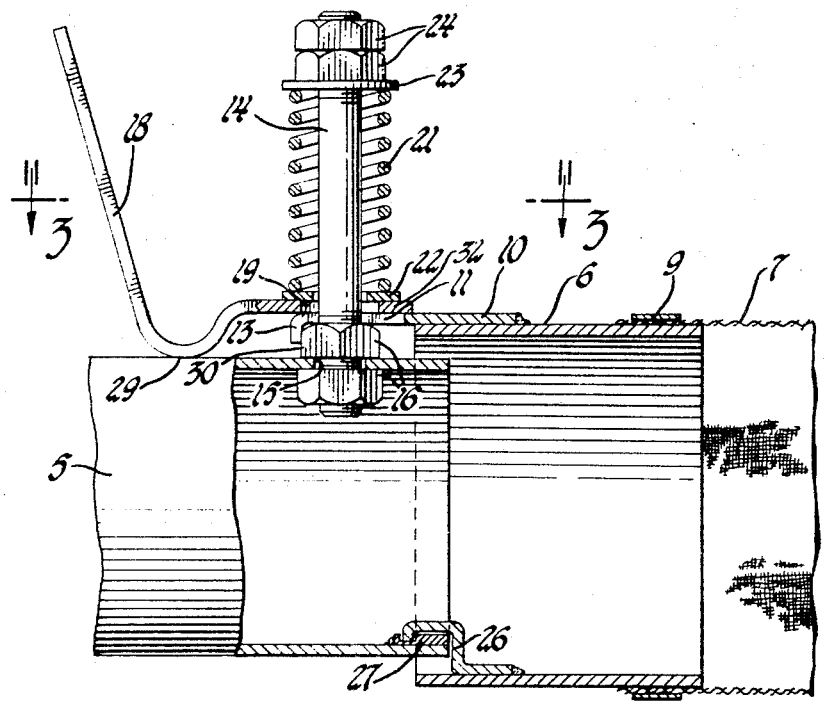
Fig.1
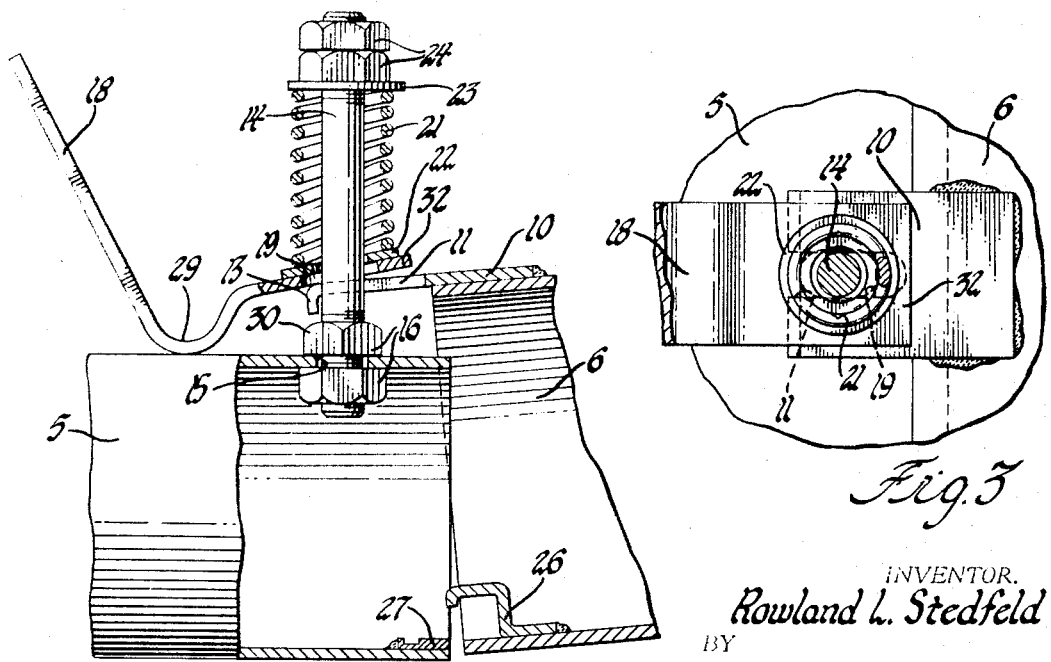
Fig.2
Fig.3
INVENTOR.
Rowland L. Stedfeld
BY
Paul Fitzpatrick
ATTORNEY

3,429,594
QUICK DISCONNECT COUPLING
Rowland L. Stedfeld, Indianapolis, Ind., assignor to
General Motors Corporation, Detroit, Mich., a
corporation of Delaware
Filed June 22, 1967, Ser. No. 647,966
U.S. Cl. 285—317                                   3 Claims
Int. Cl. F16l 37/08

ABSTRACT OF THE DISCLOSURE

A coupling for two telescoping tubes embodies a flange on one, an abutment on the other, a post on the other, a spring on the post operative to hold the abutment and flange in overlapping relation, and a lever on the post operable to disengage the abutment from the flange.

---

My invention relates to quick disconnect coupling devices. The principles of the invention may be applied in various situations, but one application of the preferred embodiment of the invention is to a quick disconnect for attaching a grass catcher to the discharge outlet of a rotary lawn mower.

Objects of the invention are to provide a readily disconnectable coupling between two bodies, one of which exerts a force on the other, and to provide a simple readily disconnectable coupling for telescoping sections of conduit where pressure seals and leak tightness are not needed.

The nature of my invention and the advantages thereof should be clear to those skilled in the art to which it pertains from the succeeding detailed description of the preferred embodiment of the invention and the accompanying drawing thereof.

FIGURE 1 is a longitudinal sectional view of a coupling according to the invention.

FIGURE 2 is a partial view illustrating the disengagement of the coupling; and

FIGURE 3 is a sectional view taken on the plane indicated by the line 3—3 in FIGURE 1.

In FIGURE 1, the duct 5 may be, for example, the outlet for grass discharged from a power mower. Means are provided to couple this to a collar 6 which is the coupling fitting for a grass-catching bag 7, only the end of which is shown. The neck of the bag may be held on the collar 6 by a clamp 9. The end of outlet 5 telescopes into collar 6. Collar 6 may be considered as a first body to be coupled and duct 5 as a second body.

The coupling means comprises a bracket 10 welded to the collar 6 having a slot 11 extending inwardly from the margin of the bracket. The outer end of the bracket is turned down to provide a flange 13 on each side of slot 11. A post 14 extends upwardly from the second body 5. This post may be constituted by a stud threaded at both ends and extending through a hole 15 in the upper surface of outlet 5. The study may be retained by nuts 16 on each surface of the body 5. A disengaging lever 18 rests on top of the bracket 10, the lever 18 having a hole which loosely surrounds the post 14. The lever 18 is held against the bracket 10 by a coil compression spring 21 which bears against the lever through a washer 22. The upper end of spring 21 bears against a washer 23 held in place by a double nut 24 threaded onto the upper end of stud 14. At the lower side of collar 6, a hook 26 is welded which engages in a notch in a keeper 27 fixed to the outlet 5.

It will be appreciated that the parts 26 and 27 could be omitted, and would not have any use in some applications of the coupling device. However, in the particular installation, they are quite desirable. FIGURE 2 illustrates the operation of the device for quick and easy release of the collar 6 from the outlet 5 by pushing the lever 18 downwardly or to the left as illustrated in FIGURE 2. A fulcrum 29 formed by a bend in the lever is brought into engagement with the outlet 5 and presses upwardly against spring 21, thus raising the collar 6 so that the flange 13 is freed from its engagement with the abutment 30 defined by the upper nut 16. Spring 21 opposes this movement of the lever, and normally holds the flange 13 in engagement with the abutment 30.

It will be apparent that the device provides a very simple and convenient structure. To reapply the collar 6 to the outlet, it is only necessary to actuate the lever 18 to raise its end 32, as illustrated in FIGURE 2, whereupon the bracket 10 may be readily slid between the end of the lever and the abutment 30 defined by the nut 16.

The detailed description of the preferred embodiment of the invention for the purpose of explaining the principles thereof is not to be considered as limiting or restricting the invention, since many modifications may be made by the exercise of skill in the art within the scope of the invention.

I claim:

1. A readily detachable coupling comprising, in combination,
    a first body having an end portion with a slot in the margin thereof and a flange extending at the terminal end of said end portion from one face of said end portion adjacent each side of the slot,
    a second body disposed adjacent the said one face,
    the second body having an abutment engaging said one face and also engaging the flange behind said flange providing a tension connection between the bodies,
    and having a post extending through the slot when the abutment is so lodged,
    a lever movable on the post and engaging the other face of the first body,
    spring means on the post urging the lever into contact with the said other face and urging said abutment into contact with said one face,
    the lever including a part engageable with the second body of move said second body in the direction to dislodge the abutment from the flange when the lever is rotated toward the second body,
    the spring means opposing such rotation.

2. A combination as recited in claim 1 in which the bodies are telescoping tubular bodies.

3. A combination as recited in claim 2 including also a latch and keeper coupling the bodies at the opposite side thereof from the said flange and abutment.

References Cited

UNITED STATES PATENTS

| | | | |
|---|---|---|---|
| 608,000 | 7/1898 | Leatherman et al. | 285—317 X |
| 2,457,593 | 12/1948 | Nelson | 287—64 X |
| 2,755,107 | 7/1956 | Dow | 285—317 X |
| 3,334,917 | 8/1967 | Smith | 287—103X |

CARL W. TOMLIN, *Primary Examiner.*

DAVE W. AROLA, *Assistant Examiner.*

U.S. Cl. X.R.

285—330, 403; 287—119